(12) United States Patent
van der Merwe et al.

(10) Patent No.: US 8,818,683 B2
(45) Date of Patent: Aug. 26, 2014

(54) METHOD AND APPARATUS FOR OPERATING A GAS TURBINE ENGINE

(75) Inventors: Gert Johannes van der Merwe, Monroe, OH (US); David Allen Bradford, Harrison, OH (US)

(73) Assignee: General Electric Company, Schenectady, NY (US)

( * ) Notice: Subject to any disclaimer, the term of this patent is extended or adjusted under 35 U.S.C. 154(b) by 1491 days.

(21) Appl. No.: 11/379,669

(22) Filed: Apr. 21, 2006

(65) Prior Publication Data

US 2007/0250245 A1    Oct. 25, 2007

(51) Int. Cl.
*F02C 9/00* (2006.01)

(52) U.S. Cl.
USPC .......... 701/100; 73/660; 701/99; 702/34; 702/35; 702/56; 702/182; 702/183

(58) Field of Classification Search
USPC .......... 701/100, 99, 1, 3; 60/773; 415/1; 73/660, 66, 432.2, 455, 457, 460, 462, 73/570, 577, 865.8, 865.9; 702/1, 33, 34, 702/35, 39, 56, 127, 182, 183, 187, 189
See application file for complete search history.

(56) References Cited

U.S. PATENT DOCUMENTS

| | | | |
|---|---|---|---|
| 3,798,626 A * | 3/1974 | Weichbrodt et al. .......... | 340/669 |
| 3,979,739 A * | 9/1976 | Birchall ......................... | 340/529 |
| 4,075,562 A | 2/1978 | Karstensen et al. | |
| 4,454,754 A * | 6/1984 | Zagranski et al. .......... | 73/112.01 |
| 4,651,563 A | 3/1987 | Zweifel | |
| 4,669,315 A * | 6/1987 | Sato et al. .................... | 73/660 |
| 4,914,953 A | 4/1990 | Viscovich | |
| 4,954,974 A * | 9/1990 | Howell et al. ................ | 701/100 |
| 4,955,269 A * | 9/1990 | Kendig et al. ................ | 73/577 |
| 4,977,395 A | 12/1990 | Bozeman, Jr. | |
| 5,069,071 A | 12/1991 | McBrien et al. | |
| 5,234,315 A * | 8/1993 | Ogihara et al. ............... | 415/16 |
| 5,363,317 A * | 11/1994 | Rice et al. .................... | 702/34 |
| 5,622,045 A * | 4/1997 | Weimer et al. ................ | 60/204 |
| 5,761,956 A | 6/1998 | Beeson et al. | |
| 6,098,022 A * | 8/2000 | Sonnichsen et al. .......... | 702/35 |
| 6,434,473 B1 * | 8/2002 | Hattori ......................... | 701/100 |

(Continued)

FOREIGN PATENT DOCUMENTS

| | | | |
|---|---|---|---|
| DE | 4032299 A1 | | 4/1992 |
| EP | 0573186 A2 | | 12/1993 |
| EP | 1312766 A2 | * | 5/2003 |
| EP | 1367226 B1 | | 8/2006 |

(Continued)

OTHER PUBLICATIONS

GB Search Report, Application No. GB0707170.7 (Aug. 7, 2007).

(Continued)

*Primary Examiner* — Stephen Holwerda
(74) *Attorney, Agent, or Firm* — William Scott Andes, Esq.; Armstrong Teasdale LLP

(57) ABSTRACT

A method for operating a gas turbine engine includes coupling at least one sensor within the gas turbine engine to transmit a signal indicative of a vibration level of a rotor assembly within the gas turbine engine, detecting the vibration level of the rotor assembly based on the signal transmitted from the at least one sensor, comparing the detected vibration level to a predetermined vibration threshold, and generating an output if the detected vibration amplitude exceeds the threshold amplitude for a predetermined duration to facilitate identifying a gas turbine engine impulse event.

11 Claims, 4 Drawing Sheets

(56) References Cited

U.S. PATENT DOCUMENTS

| | | | |
|---|---|---|---|
| 6,445,995 B1* | 9/2002 | Mollmann | 701/100 |
| 6,494,046 B1* | 12/2002 | Hayess | 60/779 |
| 6,584,849 B2 | 7/2003 | Loftus et al. | |
| 6,711,952 B2 | 3/2004 | Leamy et al. | |
| 6,768,938 B2 | 7/2004 | McBrien et al. | |
| 6,918,747 B2 | 7/2005 | Comperat et al. | |
| 7,013,210 B2 | 3/2006 | McBrien et al. | |
| 2002/0087258 A1* | 7/2002 | Johnson | 701/114 |
| 2003/0024235 A1* | 2/2003 | Pisano et al. | 60/204 |
| 2003/0066352 A1* | 4/2003 | Leamy et al. | 73/593 |
| 2004/0034483 A1 | 2/2004 | Sonnichsen et al. | |
| 2004/0060347 A1* | 4/2004 | Comperat et al. | 73/66 |
| 2004/0128974 A1* | 7/2004 | Laper | 60/39.6 |

FOREIGN PATENT DOCUMENTS

| | | |
|---|---|---|
| GB | 2020814 A | 11/1979 |
| GB | 2177509 A | 1/1987 |
| JP | 0364630 A | 3/1991 |
| JP | 2004036615 A | 2/2004 |

OTHER PUBLICATIONS

A Search and Examination Report, dated Jun. 17, 2010, from the GB Intellectual Property Office for copending GB patent application No. GB0707170.7 (7 pages).

Notice of Reasons for Rejection regarding Japanese Patent Application No. 2007-106669 dated Sep. 29, 2011; 3 pages.

* cited by examiner

METHOD AND APPARATUS FOR OPERATING A GAS TURBINE ENGINE

BACKGROUND OF THE INVENTION

This application relates generally to gas turbine engines and, more particularly, to a method and apparatus for identifying when gas turbine fan blade damage has occurred.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

At least one known gas turbine fan assembly includes a plurality of rotor blades each having an airfoil that is fabricated utilizing a metallic material, such as titanium for example, and a composite material that is bonded to the surface of the airfoil. More specifically, the known airfoil is fabricated such that the composite material is laid up as individual unidirectional plies of material on the surface of the airfoil.

During operation, foreign objects may be ingested into the engine. More specifically, if a foreign object strikes the fan airfoil, a portion of the composite material may be liberated from the airfoil and thus enter the engine flow path resulting in further foreign object damage to the gas turbine engine the foreign object cause the fan blade to bend or lean slightly resulting in increased vibration.

At least one known method of determining whether a foreign object has damaged an airfoil includes manually inspecting the gas turbine engine during scheduled maintenance periods. Another known method of determining whether a foreign object has impacted a rotor blade includes installing a vibration sensor within the gas turbine engine to monitor the vibration level of the gas turbine engine during operation. More specifically, during operation, vibration data is collected from the gas turbine engine during a plurality of flights, for example. The vibration data accumulated vibration data is then downloaded during a maintenance event and analyzed to determine whether an object has impacted a fan blade.

However, while both above described methods are effective in determining when an object has impacted an airfoil, each method is relatively time consuming thus facilitating an increase in the maintenance costs. For example, while manually inspecting the gas turbine engine to identify damaged fan blades is effective, the procedure generally is relatively time consuming. Moreover, while utilizing the vibration data to identify damaged fan blades is also effective, known algorithms require a plurality of data that is collected over an extended period generally including a plurality of flights. The accumulated data is then analyzed during a maintenance period to identify potentially damaged fan blades. As a result, damaged fan blades may not be detected until the next maintenance event.

BRIEF DESCRIPTION OF THE INVENTION

In one aspect, method for operating a gas turbine engine is provided. The method includes coupling at least one sensor within the gas turbine engine to transmit a signal indicative of a vibration level of a rotor assembly within the gas turbine engine, detecting the vibration level of the rotor assembly based on the signal transmitted from the at least one sensor, comparing the detected vibration level to a predetermined vibration threshold, and generating an output if the detected vibration amplitude exceeds the threshold amplitude for a predetermined duration to facilitate identifying a gas turbine engine impulse event.

In another aspect, a monitoring system for a turbine engine including a combustor is provided. The monitoring system includes at least one sensor configured to transmit a signal indicative of a vibration level of a rotor assembly within the gas turbine engine, and an engine monitoring unit (EMU) coupled to the at least one sensor for receiving the signal transmitted therefrom, the EMU configured to detect the vibration level of the rotor assembly based on the signal transmitted from the at least one sensor and generate an output if the detected vibration level exceeds a threshold level for a predetermined duration to facilitate identifying a gas turbine engine impulse event.

In a further aspect, a gas turbine engine assembly is provided. The gas turbine engine assembly includes a core gas turbine engine including a compressor, a combustor, and a turbine coupled to the compressor, a fan assembly coupled to the core gas turbine engine, at least one sensor configured to transmit a signal indicative of a vibration level of at least one of the compressor and the fan assembly, and an engine monitoring unit (EMU) coupled to the at least one sensor for receiving the signal transmitted therefrom, the EMU configured to detect the vibration level of at least one of the compressor and the fan assembly based on the signal transmitted from the at least one sensor and generate an output if the detected vibration level exceeds a threshold level for a predetermined duration to facilitate identifying a gas turbine engine impulse event.

DETAILED DESCRIPTION OF THE INVENTION

Figure 1:
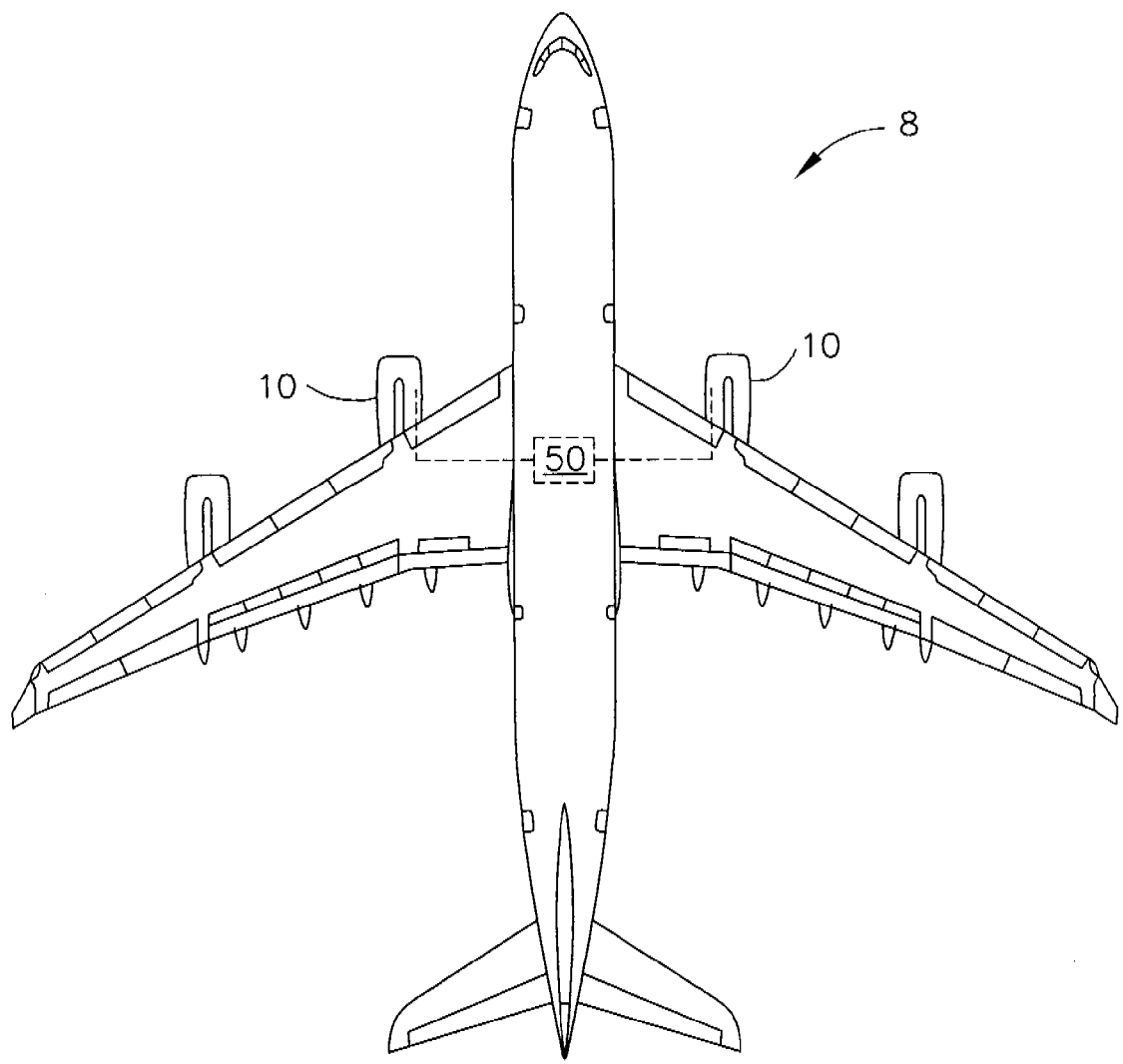
FIG. 1 is a perspective view of an exemplary aircraft.
Figure 2:
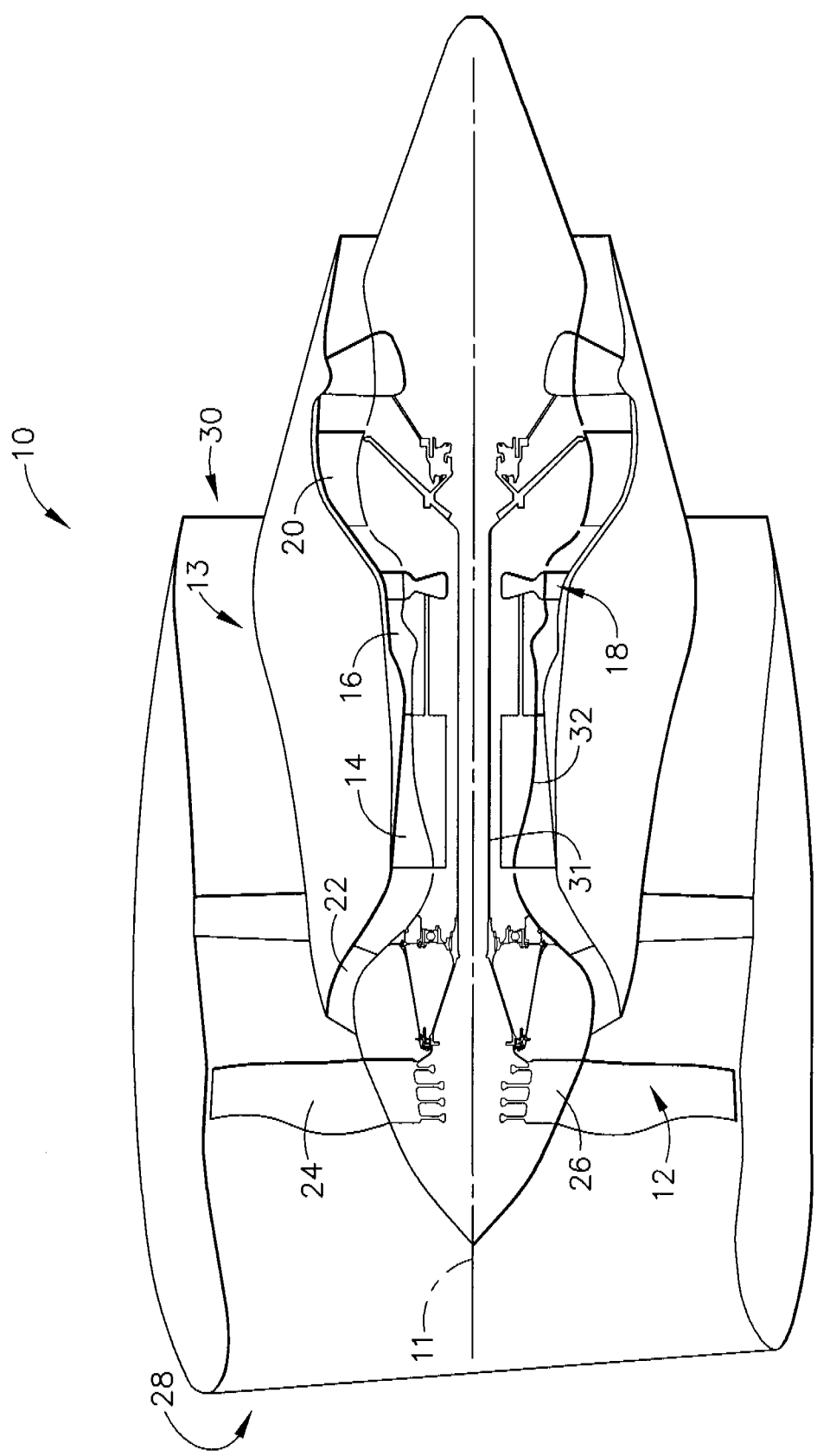
FIG. 2 is a cross-sectional view of a portion of an exemplary gas turbine engine that can be used with the aircraft shown in FIG. 1.

FIG. 1 is a schematic illustration of an exemplary aircraft 8 that includes at least one gas turbine engine assembly 10 and at least one engine monitoring unit (EMU) 50 that is coupled to gas turbine engine assemblies 10 and configured to receive and/or transmit information to gas turbine engine assembly 10 as will be discussed later herein. Although, FIG. 1 illustrates four gas turbine engine assemblies 10 that are coupled to a single EMU 50, it should be realized that aircraft 8 may include any quantity of gas turbine engine assemblies and may include a single EMU coupled to each respective gas turbine engine assembly. FIG. 2 is a cross-sectional view of a portion of exemplary gas turbine engine 10 (shown in FIG. 1).

In the exemplary embodiment, gas turbine engine assembly 10 has a longitudinal axis 11 and includes a fan assembly 12, and a core gas turbine engine 13 that includes a high pressure compressor 14, a combustor 16, and a high pressure turbine 18. In the exemplary embodiment, gas turbine engine assembly 10 also includes a low pressure turbine 20 and a multi-stage booster compressor 22.

Fan assembly 12 includes an array of fan blades 24 extending radially outward from a rotor disk 26. Engine 10 has an intake side 28 and an exhaust side 30. In the exemplary embodiment, gas turbine engine 10 is a GE90 gas turbine engine that is available from General Electric Company, Cincinnati, Ohio. Fan assembly 12, booster 22, and low-pressure turbine 20 are coupled together by a first rotor shaft 31, and compressor 14 and high-pressure turbine 18 are coupled together by a second rotor shaft 32.

In operation, air flows through fan assembly 12 and compressed air is supplied to high pressure compressor 14 through booster 22. The booster discharge air is channeled to compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Engine 10 is operable at a range of operating conditions between design operating conditions and off-design operating conditions.

Figure 3:
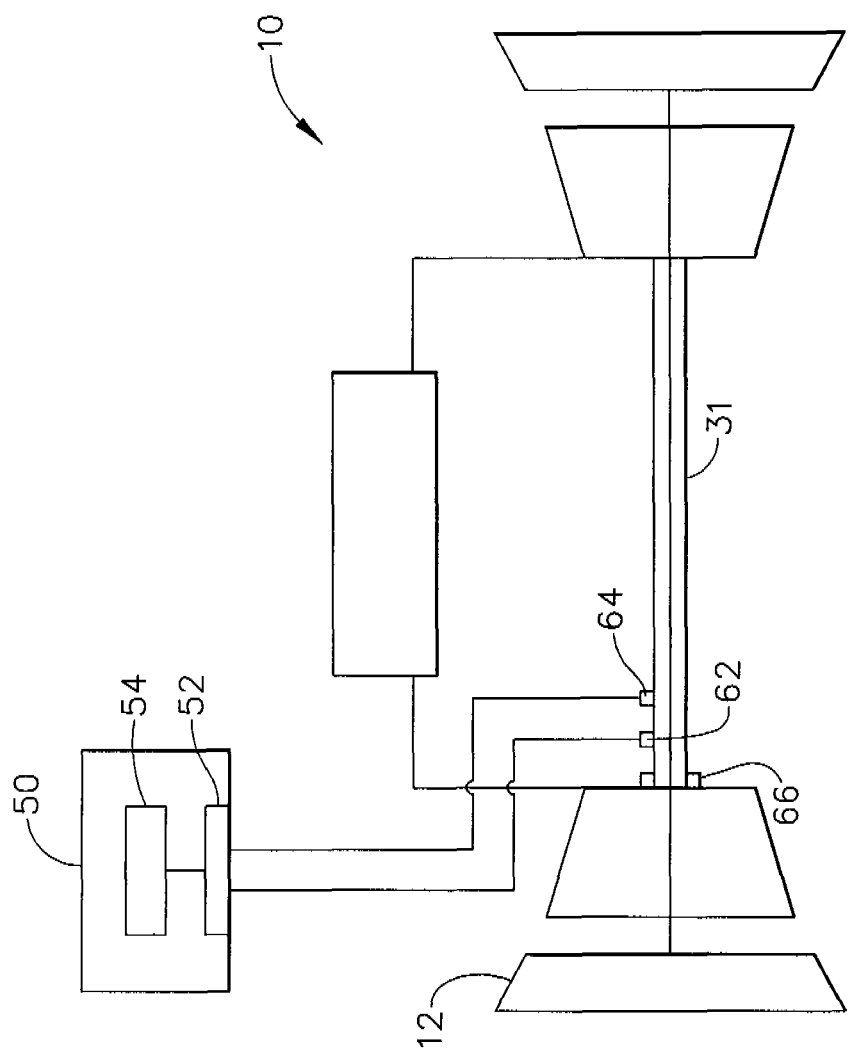
FIG. 3 is a schematic illustration an exemplary system that includes and engine monitoring unit coupled to the gas turbine engine shown in FIG. 2.

FIG. 3 is a simplified schematic illustration of an exemplary Engine Monitoring Unit 50 that is installed on and coupled to gas turbine engine 10. In the exemplary embodiment, EMU 50 includes an analog to digital converter (A/D) 52, and is configured to receive analog signals from gas turbine engine assembly 10 and to convert the analog signals to digital signals. The digital signals are then transmitted to a processor 54 that in the exemplary embodiment is installed within EMU 50. Optionally, EMU 50 may also include any engine controller that is configured to send and/or receive signals from gas turbine engine 10. As such, EMU 50 may be any electronic device that resides on or around a gas turbine engine assembly 10 and includes at least one of software and/or hardware that is programmed to control and/or monitor gas turbine engine 10.

More specifically, gas turbine engine 10 includes a plurality of data and/or monitoring sensors that are utilized to sense selected data parameters related to the operation of gas turbine engine 10. In the exemplary embodiment, such sensors may include at least one accelerometer 62 that utilized to provide gas turbine engine vibration data to EMU 50, and at least one speed sensor 64 that is utilized to provide gas turbine engine speed data to EMU 50. In the exemplary embodiment, accelerometer 62 is coupled proximate to a fan support bearing, such as fan bearing 66 to monitor the vibration of fan assembly 12, and speed sensor 64 is coupled proximate to shaft 31 to monitor the rotational speed of fan assembly 12.

The EMU 50 receives signals from the engine and aircraft data sensors 62 and 64 via A/D converter 52. Processor 54 receives the signals from A/D converter and analyzes the information utilizing an algorithm programmed into processor 54 as will be discussed later herein.

Although only a few engine sensors are shown, it should be realized that gas turbine engine 10 can include a plurality of engine sensors that are each configured to sense a respective vibration level and/or speed of various rotating components installed in gas turbine engine assembly 10.

Additionally, although the herein described methods and apparatus are described in an aircraft setting, it is contemplated that the benefits of the invention accrue to those systems typically employed in an industrial setting such as, for example, but not limited to, power plants. Accordingly, and in the exemplary embodiment, gas turbine engine assembly 10 and EMU 50 are coupled to a vehicle such as aircraft 8, such that information collected by EMU 50 is either stored in EMU 50 on aircraft 8, or alternatively, the information is transmitted to a ground facility and downloaded onto a local computer (not shown). In an alternative embodiment, gas turbine engine assembly 10 and EMU 50 are installed in a ground facility such as a power plant. More specifically, although the method described herein is related to an aircraft, i.e. sensors 62 and 64 are positioned to monitor the vibration and speed of fan assembly 12, engine assembly 12 may not include fan assembly 12 and as such, sensors 62 and 64 may be utilized to monitor the vibration level and speed of compressor 14, for example.

Figure 4:
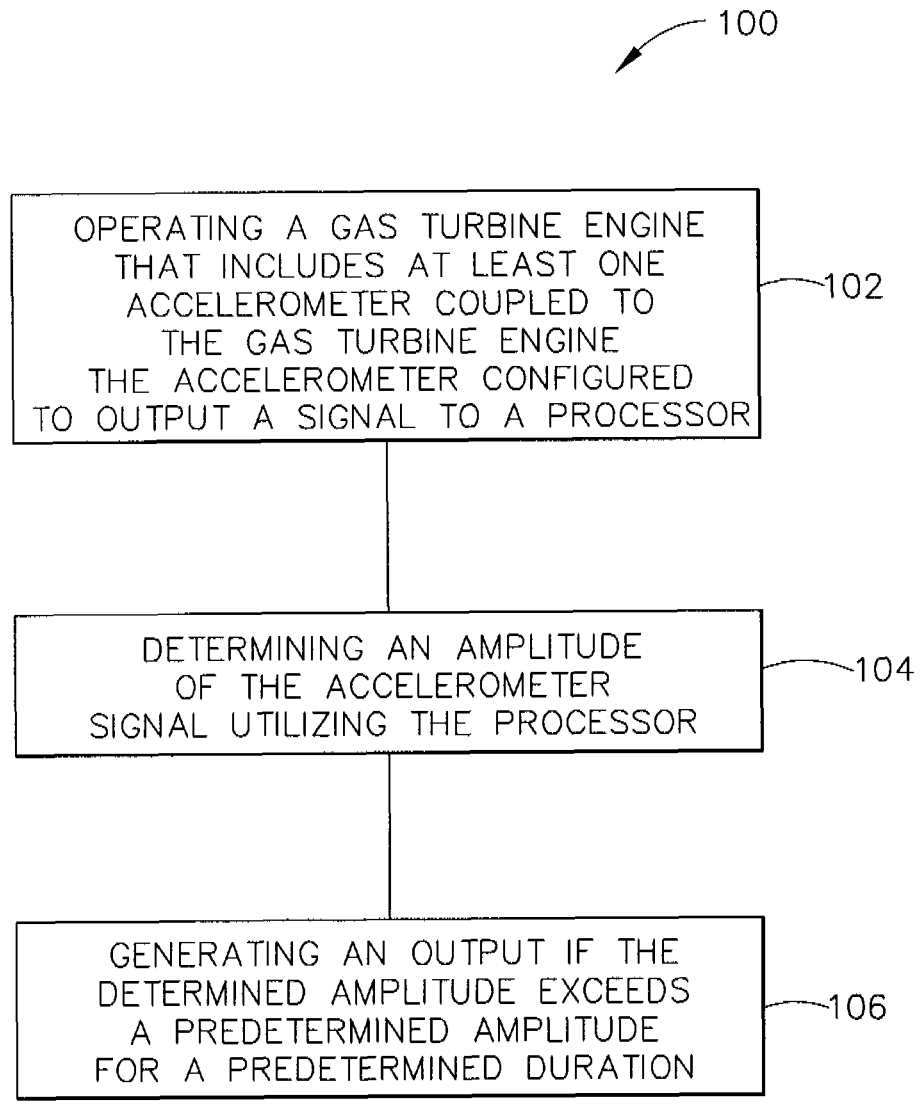
FIG. 4 is flowchart illustrating an exemplary method of operating a gas turbine engine.

FIG. 4 is a flow chart illustrating an exemplary method 100 for detecting gas turbine engine foreign object ingestion invents. More specifically, method 100 may be an algorithm that is installed on processor 54 that receives data from sensors 62 and 64, analyzes the received inputs, and based on the received inputs determines when a foreign object has been ingested into gas turbine engine assembly 10.

For example, as discussed above, when a foreign object strikes a gas turbine engine, such as striking fan blade 24 a portion of the composite material may be liberated from fan blade 24 causing the fan to bend or lean. This event may cause a change in fan blade geometry and may also result in temporary increase in fan vibration, referred to herein as an impulse event, which is detected by sensor 62 and/or a temporary change in rotational speed of shaft 31 which is detected by sensor 64. As such, method 100 may be utilized to detect an impulse event approximately simultaneously when the impulse event has occurred.

Method 100 therefore includes operating 102 a gas turbine engine that includes at least one accelerometer 62 coupled to the gas turbine engine, the accelerometer configured to output a signal to a processor, such as processor 52. Method further includes determining 104 an amplitude of the accelerometer signal utilizing the processor 52 and generating 106 an output if the determined amplitude exceeds a predetermined amplitude for a predetermined duration.

More specifically, when an impulse event occurs, the fan assembly may experience a change in vibration levels that occur for a relatively short duration. Additionally, if the impulse event is rather large, i.e. a rather large object strikes the fan assembly, the fan assembly may experience a temporary decrease in rotational speed that is detected by sensor 64. As such, vibration data and rotational speed data for a plurality of gas turbine engines collected over an extended period of time is analyzed, by the manufacturer for example, to generate information that may be utilized by EMU 50 to determine when an impulse event has occurred. For example, based on data analysis, the manufacturer may determine that an impulse event has probably occurred when the vibration level of the fan assembly exceeds approximately 5 mils for a duration of approximately 3 seconds. It should be realized that the above predetermined vibration and duration levels are exemplary only, and may be modified to suit the specific gas turbine engine assembly which is being monitored. The predetermined vibration and duration levels are then downloaded and stored in EMU 50 such that the information may be utilized on a real-time basis.

For example, during operation, sensors 62 and 64 continuously transmit vibration and speed data to EMU 50. EMU then analyzes the received data utilizing an algorithm stored on processor 54. More specifically, processor 52 continuously monitors the amplitude of the signal received from the accelerometer 62 and stores the amplitude signal in a database within processor 54. The amplitude of the vibration signal is then compared to the predetermined amplitude, i.e. the a prior knowledge, that is stored within the database. In the exemplary embodiment, if the amplitude of the fan vibration signal exceeds 5 mils for a duration that is greater than 3 seconds, EMU 50 may be programmed to generate an indication that an impulse event has occurred. For example, the indication may be either an audio or a visual indication that alerts either the aircrew or ground personnel that an impulse event has occurred.

To further quantify whether an impulse event has occurred, EMU 50 may also utilize the data received from speed sensor 64. For example, as discussed above, an impulse event may result in a temporary change in rotational speed of shaft 31 which is detected by sensor 64. As such, EMU 50 continuously receives the speed signal received from sensor 64 and stores the data in processor database. The speed signal is then compared to a predetermined speed signal, i.e. the a prior knowledge, that is stored within the database. For example, if the speed of fan assembly decreases by approximately two percent for a duration that is less than approximately 1 second, EMU 50 may programmed to generate an indication that an impulse event has occurred.

In the exemplary embodiment, the information received from vibration sensor 62 and speed sensor 64 are each utilized to determine when an impulse event has occurred. Optionally, the information received from vibration sensor 62 and speed sensor 64 may be utilized independently to determine when an impulse event has occurred. For example, processor 52 may generate an indication that an impulse event has occurred based on the information received from either the vibration sensor 62 or the speed sensor 64.

To further quantify whether an impulse event has occurred, EMU 50 may also utilize the data received from vibration sensor 62 to determine whether a vector change has occurred. For example, during normal operation, the data may indicate that the gas turbine engine fan assembly is operating with a vibration level of approximately 1 mil with a vector of approximately 0 degrees. However, an impulse event may result in a temporary change in the vector. For example, an impulse event may cause the vibration level to increase to 5 mils and also result in a vector change of approximately 180 degrees.

In the exemplary embodiment, the vector information, the vibration information, and the rotational speed information are each utilized to determine when an impulse event has occurred. Optionally, the information may be utilized independently to determine when an impulse event has occurred.

Described herein is a method and system to facilitate determining when an impulse event has occurred in a gas turbine engine. In the exemplary embodiment, system 50 includes the hardware and software for gathering and processing the data that is generated by gas turbine engine 10 utilizing sensors 62 and 64. More specifically, a plurality of flight parameters, i.e. the data, is acquired from plurality of sensors 62 and 64 which are coupled to gas turbine engine 10. In the exemplary embodiment, all sensor data that is generated utilizing sensors 62 and 64 is stored in system 50 for at least one flight, and optionally for a plurality of flights. Accordingly, and in the exemplary embodiment, sensors 62 and 64 are not periodically sampled, rather a substantially continuous data stream is channeled from sensors 62 and 64 to system 50 such that substantially all the vibration and speed data generated by gas turbine engine 10 during all flight conditions, can be collected, processed, and utilized to determine if an impulse event has occurred during operation.

More specifically, the vibration and speed data generated by gas turbine engine 10 during all flight conditions, may be collected, processed, and utilized to determine if an impulse event has occurred during operation. If system 50 determines that an impulse event has occurred, this information may be relayed to the ground station and/or ground crew such that maintenance may be performed at the end of the flight. System 50 therefore provides a real-time indication that engine 10 may require an inspection and/or maintenance prior to the next operational period. As a result, system 50 facilitates immediately identifying possible engine damage.

Accordingly, known methods of identifying possible engine blade damage rely on manual inspection of the engine or analyzing data collected over a length of many flights. More specifically, known systems are not configured to approximately instantaneously determine whether a foreign object has caused damage to the gas turbine engine. Rather, known systems are configured to monitor long term vibrational trends and based on these trends, determine whether the gas turbine engine should be inspected for possible foreign object damage during the maintenance period based on this information.

More specifically, the method and system described herein is configured such that a customer may determine if the gas turbine engine should be inspected at the end of a specific flight rather than during the normal maintenance period. Accordingly, customers will be able to identify potential foreign object damage prior to resuming normal operations.

Moreover, during or after the flight, the engine data stored within system 50, representing the engine data collected during each flight may be transmitted to ground personnel to alert the ground personnel that the gas turbine engine may require further maintenance prior to resuming normal flight operations.

While the invention has been described in terms of various specific embodiments, those skilled in the art will recognize that the invention can be practiced with modification within the spirit and scope of the claims.

What is claimed is:

1. A method for operating a gas turbine engine, said method comprising:
    detecting a change in a rotational speed of a rotor assembly based on a signal transmitted from at least one speed sensor, wherein the change in rotational speed persists for at least a specified period;
    comparing the detected change in rotational speed to a threshold speed range;
    generating a first output when the detected change in rotational speed exceeds the threshold speed range for a first predetermined duration, wherein the first output is at least one of an audio and a visual indication alerting a user;
    identifying, based on the first output, the occurrence of an engine impulse event;
    detecting the vibration level of the rotor assembly based on a signal transmitted from at least one sensor;
    comparing the detected vibration level to a predetermined amplitude vibration threshold range and a predetermined vibration duration threshold range, wherein the predetermined vibration duration threshold range is determined using vibration data collected from at least one gas turbine engine during a plurality of flights; and
    generating a second output when the detected vibration level exceeds the predetermined vibration amplitude threshold range for a period of time that exceeds the predetermined vibration duration threshold range to identify a gas turbine engine impulse event.

2. A method in accordance with claim 1 further comprising:
    determining a vector change in the vibration level of the rotor assembly based on the signal transmitted from the at least one sensor; and generating a third output when the detected vector change exceeds a predetermined threshold range to identify a gas turbine engine impulse event.

3. A method in accordance with claim 1 further comprising transmitting the generated indication to a ground station.

4. A monitoring system for a gas turbine engine including a combustor, said system comprising:
   at least one sensor configured to transmit a signal indicative of a vibration level of a rotor assembly within the gas turbine engine;
   at least one speed sensor configured to transmit a speed signal indicative of a rotational speed of the rotor assembly; and
   an engine monitoring unit (EMU) coupled to said at least one sensor for receiving the signal transmitted therefrom, said EMU configured to:
      detect the vibration level of the rotor assembly based on the signal transmitted from the at least one sensor;
      detect a change in the rotational speed of the rotor assembly based on the speed signal from the at least one speed sensor, wherein the change in rotational speed persists for at least a specified period;
      generate a first output when the change in rotational speed exceeds a threshold speed range for a first predetermined duration, wherein the first output is at least one of an audio and a visual indication alerting a user;
      identify the occurrence of an engine impulse event based on the first output;
      generate a second output when the detected vibration level exceeds a predetermined vibration amplitude threshold range for a period of time that exceeds a predetermined vibration duration threshold range; and
      generate an indication of a gas turbine engine impulse event based on the first and second generated outputs;
      wherein the first and second predetermined durations are stored in the EMU.

5. A monitoring system in accordance with claim 4 wherein said EMU is further configured to determine a vector change in the vibration level of the rotor assembly based on the signal transmitted from the at least one sensor, and generate a third output if the detected vector change exceeds a predetermined threshold range to identify a gas turbine engine impulse event.

6. A monitoring system in accordance with claim 4 wherein said EMU is further configured to transmit the indication of the engine impulse event to a ground station.

7. A gas turbine engine assembly comprising:
   a core gas turbine engine comprising a compressor, a combustor, and a turbine coupled to said compressor;
   a fan assembly coupled to said core gas turbine engine;
   at least one sensor configured to transmit a signal indicative of a vibration level of at least one of said compressor and said fan assembly;
   at least one speed sensor positioned within the gas turbine engine, said speed sensor configured to transmit a signal indicative of a rotational speed of said fan assembly; and
   an engine monitoring unit (EMU) coupled to said at least one sensor for receiving the signal transmitted therefrom, said EMU configured to:
      detect a change in rotational speed of the fan assembly, wherein the change in rotational speed persists for at least a specified period;
      generate a first output when the detected change in rotational speed exceeds a threshold speed range for a first predetermined duration, wherein the first output is at least one of an audio and a visual indication alerting a user;
      identify the occurrence of an engine impulse event based on the first output;
      detect the vibration level of at least one of the compressor and the fan assembly based on the signal transmitted from the at least one sensor;
      generate a second output when the detected vibration level exceeds a predetermined vibration amplitude threshold range for a period of time that exceeds a predetermined vibration duration threshold range; and
      generate an indicator of a gas turbine engine impulse event based on the first and second generated outputs;
      wherein the first and second predetermined durations are stored in the EMU.

8. A gas turbine engine assembly in accordance with claim 7 wherein said at least one sensor comprises an accelerometer that is configured to detect fan imbalance, said accelerometer configured to transmit a signal indicative of the vibration level of said fan assembly to said EMU.

9. A gas turbine engine assembly in accordance with claim 7 wherein said EMU is further configured to determine a vector change in the vibration level of the fan assembly based on the signal transmitted from the at least one sensor, and generate a third output if the detected vector change exceeds a predetermined threshold range to identify a gas turbine engine impulse event.

10. A gas turbine engine assembly in accordance with claim 7 wherein said EMU is further configured to transmit the indicator of the engine impulse event to a ground station.

11. A method in accordance with claim 1, wherein the gas turbine engine includes an engine monitoring unit physically coupled to the gas turbine engine; said method further comprising:
   generating, via the engine monitoring unit, an indication of the engine impulse event based on at least one of the first and second generated outputs.

* * * * *